United States Patent
Zeng et al.

(10) Patent No.: US 10,858,514 B2
(45) Date of Patent: Dec. 8, 2020

(54) RESIN COMPOSITION AND PRE-PREG AND LAMINATE USING THE COMPOSITION

(71) Applicant: Shengyi Technology Co., Ltd., Guangdong (CN)

(72) Inventors: Xianping Zeng, Guangdong (CN); Guangbing Chen, Guangdong (CN); Chiji Guan, Guangdong (CN); Wenhua Yang, Guangdong (CN)

(73) Assignee: Shengyi Technology Co., Ltd., Guangdong (CN)

( * ) Notice: Subject to any disclaimer, the term of this patent is extended or adjusted under 35 U.S.C. 154(b) by 94 days.

(21) Appl. No.: 15/555,212

(22) PCT Filed: Sep. 18, 2015

(86) PCT No.: PCT/CN2015/089907
§ 371 (c)(1),
(2) Date: Sep. 1, 2017

(87) PCT Pub. No.: WO2016/138760
PCT Pub. Date: Sep. 9, 2016

(65) Prior Publication Data
US 2018/0037736 A1   Feb. 8, 2018

(30) Foreign Application Priority Data

Mar. 4, 2015 (CN) .......................... 2015 1 0097067

(51) Int. Cl.
| | | |
|---|---|---|
| C08L 71/12 | (2006.01) |
| B32B 15/085 | (2006.01) |
| B32B 15/20 | (2006.01) |
| C08L 47/00 | (2006.01) |
| B32B 15/14 | (2006.01) |
| C08F 279/02 | (2006.01) |
| C08L 51/08 | (2006.01) |
| B32B 5/26 | (2006.01) |
| C08F 290/06 | (2006.01) |
| C08L 9/06 | (2006.01) |
| B32B 15/18 | (2006.01) |
| B32B 7/04 | (2019.01) |
| B32B 15/08 | (2006.01) |
| B32B 27/08 | (2006.01) |

(Continued)

(52) U.S. Cl.
CPC .............. *C08L 71/126* (2013.01); *B32B 5/26* (2013.01); *B32B 7/04* (2013.01); *B32B 15/08* (2013.01); *B32B 15/085* (2013.01); *B32B 15/14* (2013.01); *B32B 15/18* (2013.01); *B32B 15/20* (2013.01); *B32B 27/08* (2013.01); *C08F 279/02* (2013.01); *C08F 290/062* (2013.01); *C08J 5/24* (2013.01); *C08L 9/06* (2013.01); *C08L 25/10* (2013.01); *C08L 47/00* (2013.01); *C08L 51/08* (2013.01); *C08L 71/12* (2013.01); *B32B 2260/021* (2013.01); *B32B 2260/046* (2013.01); *B32B 2262/101* (2013.01); *B32B 2307/204* (2013.01); *B32B 2307/306* (2013.01); *B32B 2307/4026* (2013.01); *B32B 2307/732* (2013.01); *B32B 2457/08* (2013.01); *C08J 2309/06* (2013.01); *C08J 2325/10* (2013.01); *C08J 2347/00* (2013.01); *C08J 2371/02* (2013.01); *C08J 2371/12* (2013.01); *C08J 2409/00* (2013.01); *C08J 2409/06* (2013.01); *C08J 2425/10* (2013.01); *C08J 2447/00* (2013.01); *C08J 2471/02* (2013.01); *C08L 2201/02* (2013.01)

(58) Field of Classification Search
None
See application file for complete search history.

(56) References Cited

U.S. PATENT DOCUMENTS

| | | | | | |
|---|---|---|---|---|---|
| 5,034,482 | A | * | 7/1991 | Kohara | .................. C08G 61/08 526/114 |
| 2008/0300350 | A1 | † | 12/2008 | Ohno | |

(Continued)

FOREIGN PATENT DOCUMENTS

| | | |
|---|---|---|
| CN | 101643650 A | 2/2010 |
| CN | 103965606 A | 8/2014 |

(Continued)

OTHER PUBLICATIONS

Abstract of JP-56133355-A, retrieved Jan. 22, 2019. (Year: 1981).*

(Continued)

*Primary Examiner* — Callie E Shosho
*Assistant Examiner* — Krupa Shukla
(74) *Attorney, Agent, or Firm* — Norton Rose Fulbright US LLP; James R. Crawford

(57) ABSTRACT

Copper clad laminates and a resin composition and a prepreg and a laminate using the composition. The resin composition contains: (A) a prepolymer of vinyl thermosetting polyphenylene ether and a bifunctional maleimide or a multifunctional maleimide; and, (B) a polyolefin resin. Employing the prepolymer of vinyl thermosetting polyphenylene ether and the bifunctional maleimide or the multifunctional maleimide, solves the problem of incompatibility of the bifunctional maleimide or the multifunctional maleimide with the vinyl thermosetting polyphenylene ether and the polyolefin resin. An aqueous glue solution so mixed is uniform and consistent, the prepreg has a uniform expression, and a substrate resin area is free of a phase-separation problem.

15 Claims, No Drawings

(51) Int. Cl.
  *C08J 5/24* (2006.01)
  *C08L 25/10* (2006.01)

(56) References Cited

U.S. PATENT DOCUMENTS

| | | | |
|---|---|---|---|
| 2009/0171028 A1* | 7/2009 | Jin | C08L 33/08 |
| | | | 525/221 |
| 2010/0233495 A1† | 9/2010 | Mizuno | |
| 2014/0044918 A1* | 2/2014 | Zeng | C08L 47/00 |
| | | | 428/141 |
| 2016/0148719 A1* | 5/2016 | Yin | C08L 71/12 |
| | | | 524/119 |

FOREIGN PATENT DOCUMENTS

| | | |
|---|---|---|
| CN | 104031377 A | 9/2014 |
| CN | 104341766 A | 2/2015 |
| CN | 104725828 A | 6/2015 |
| JP | 56133355 A * | 10/1981 |
| JP | S57185350 A | 11/1982 |
| KR | 20080060540 A | 7/2008 |
| TW | 200942578 | 10/2009 |
| TW | 201425289 | 7/2014 |
| TW | 201506081 | 2/2015 |
| WO | WO 2011/123389 | 10/2011 |

OTHER PUBLICATIONS

Additives Flame Retardants, Kunststoffe international, Aug. 2014, pp. 48-53. (Year: 2014).*
International Search Report issued in PCT/CN2015/089907 dated Dec. 25, 2015.

\* cited by examiner
† cited by third party

RESIN COMPOSITION AND PRE-PREG AND LAMINATE USING THE COMPOSITION

CROSS REFERENCE TO RELATED APPLICATIONS

This application is a § 371 of International Application No. PCT/CN2015/089907 filed Sep. 18, 2015, and claims priority from Chinese Patent Application No. 201510097067.6 filed Mar. 4, 2015.

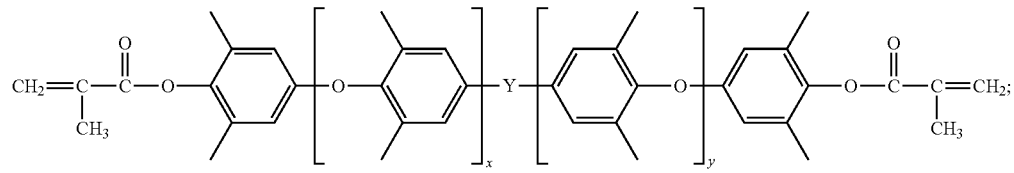

TECHNICAL FIELD

The present invention belongs to the technical field of copper clad laminates and relates to a resin composition and a prepreg and a laminate using the composition.

BACKGROUND ART

In recent years, with the development of electronic information technology, electronic equipments have become miniaturization, high-density, and information trends to be large-capacity and high-speed, which put forward higher requirements for overall performance of circuit substrates including heat resistance, water absorption, chemical resistance, mechanical properties, dimensional stability, dielectric properties and others.

In terms of dielectric properties, the relationship between signal transmission rate and dielectric constant Dk of insulating material in high-speed circuit is that: the lower the dielectric constant Dk of insulating material is, the faster the signal transmission rate is. Therefore, to achieve high signal transmission rate, substrates having low dielectric constant must be developed. As the signal rate becoming high, the loss of signal in the substrate can no longer be ignored. The relationship among signal loss and rate, dielectric constant Dk and dielectric loss factor Df is that: the smaller the dielectric constant Dk of a substrate is, the smaller the dielectric loss factor Df is, and the smaller the signal loss is.

Therefore, the development of a high-speed circuit substrate having low dielectric constant Dk, low dielectric loss factor Df and good heat resistance becomes a research direction commonly focused by CCL manufacturers.

Polyphenylene ether resin contains a large number of benzene ring structures in its molecular structure, and no strong polar group, giving excellent performances to polyphenylene ether resin, such as high glass transition temperature, good dimensional stability, low linear expansion coefficient and low water absorption, especially excellent low dielectric constant and low dielectric loss, and thus is an ideal resin material for preparing high-speed circuit boards.

Butadiene-styrene copolymer does not contain polar groups, and has good dielectric properties, low water absorption, good flexibility. Butadiene-styrene copolymer contains reactive vinyl group and is commonly used as a crosslinking agent for high-speed electronic circuit substrate resin systems.

Maleimide has excellent heat resistance, flame resistance, mechanical properties and dimensional stability, and is usually used as a crosslinking agent for high-speed electronic circuit substrate resin systems.

CN103965606A discloses a low dielectric material comprising: 40 to 80 parts by weight of polyphenylene ether, 5 to 30 parts by weight of bismaleimide, and 5 to 30 parts by weight of a polymer additive. Wherein the structural formula of the polyphenylene ether is as follow:

the polymer additive is selected from the group consisting of polybutadiene, styrene-butadiene copolymer, styrene-butadiene-divinylbenzene copolymer, styrene-maleic anhydride copolymer, maleic anhydride-grafted polybutadiene, and combinations thereof. Since styrene-butadiene copolymer, polybutadiene, styrene-butadiene copolymer-divinylbenzene copolymer and polyphenylene ether are incompatible with maleimide, there are problems in the mixing process that: glue liquid is layered, the surface of prepreg has turtle-like cracks, and substrate resin area occurs phase separation.

CN101643650A discloses a phosphorus-containing flame retardant. The phosphorus-containing flame retardant is added to resin systems having unsaturated double bonds, engineering plastics or polyolefin polymers, and plays roles of crosslinking and flame retardancy. Wherein, the resin having unsaturated double bonds includes homopolymers or copolymers of butadiene, styrene, isoprene, divinylbenzene, methylstyrene, acrylate, acrylonitrile, N-phenylmaleimide, N-vinylphenylmaleimide; vinyl substituted polyphenylene ethers; for example, a resin composition of a copolymer of butadiene, styrene and N-phenylmaleimide and a vinyl-substituted polyphenylene ether, or a resin composition of a copolymer of butadiene, styrene and N-vinylphenylmaleimide and a vinyl-substituted polyphenylene ether is used for preparing electronic circuit substrates. Since the used maleimide has a monomaleimide structure, the prepared substrate has lower heat resistance, higher thermal expansion coefficient, shorter thermal stratification time and lower thermal decomposition temperature, compared with a substrate prepared using maleimide having a bifunctional maleimide or polyfunctional maleimide structure.

Contents of the Invention

In view of existing problems, one object of the present invention is to provide a resin composition which is capable of satisfying the requirements for overall performance such as dielectric properties and heat resistance for high-speed electronic circuit substrates.

In order to achieve the above purpose, the present invention employs the following technical solution.

A resin composition comprises:

(A) a prepolymer of vinyl thermosetting polyphenylene ether and bifunctional maleimide or polyfunctional maleimide; and (B) a polyolefin resin.

The weight of the bifunctional maleimide or polyfunctional maleimide is 5 to 20 parts by weight, for example, 5 parts by weight, 10 parts by weight, 15 parts by weight, or 20 parts by weight, based on 100 parts by weight of the vinyl thermosetting polyphenylene ether.

When the bifunctional maleimide or polyfunctional maleimide is used in an amount ranging from 5 to 20 parts by weight based on 100 parts by weight of the vinyl thermosetting polyphenylene ether, not only the bifunctional maleimide or polyfunctional maleimide and 100 parts by weight of polyphenylene ether can subject to a good prepolymerization, but also the prepared boards can achieve good dielectric properties.

The weight of the polyolefin resin is 5 to 100 parts by weight, for example, 10 parts by weight, 15 parts by weight, 20 parts by weight, 25 parts by weight, 30 parts by weight, 35 parts by weight, 40 parts by weight, 45 parts by weight, 50 parts by weight, 55 parts by weight, 60 parts by weight, 65 parts by weight, 70 parts by weight, 75 parts by weight, 80 parts by weight, 85 parts by weight, 90 parts by weight or 95 parts by weight, based on 100 parts by weight of the prepolymer of vinyl thermosetting polyphenylene ether and bifunctional maleimide or polyfunctional maleimide.

When the polyolefin resin is used in an amount ranging from 5 to 100 parts by weight based on 100 parts by weight of the prepolymer of vinyl thermosetting polyphenylene ether and bifunctional maleimide or polyfunctional maleimide, the prepared boards can achieve good cross-linking density and dielectric properties.

In the resin composition, the vinyl thermosetting polyphenylene ether has a structure represented by formula (1):

$$Z(-O-Y-)_a(-O-Y-O-)(-Y-O-)_bZ \quad (1).$$

In formula (1), a and b are independently an integer of 1 to 30, for example, 2, 5, 8, 11, 14, 17, 20, 23, 26 or 29, and Z has a structure of formula (2) or (3), —(O—Y—)— has a structure of formula (4), and —(—O—X—O—)— has a structure of formula (5).

(2)

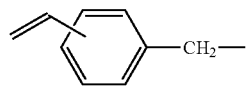

(3)

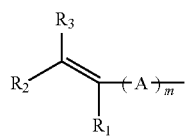

In formula (3), A is arylene group, carbonyl group, or alkylene group having 1 to 10 carbon atoms (e.g., 2, 3, 4, 5, 6, 7, 8 or 9); m is an integer of 0 to 10 (e.g., 1, 2, 3, 4, 5, 6, 7, 8 or 9); $R_1$, $R_2$ and $R_3$ are the same or different and are each independently hydrogen or alkyl group having 10 or less carbon atoms.

(4)

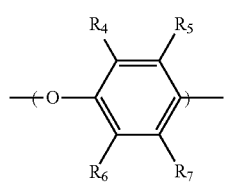

In formula (4), $R_4$ and $R_6$ are the same or different, and are each independently hydrogen atom, halogen atom, alkyl group having 8 or less carbon atoms or phenyl group having 8 or less carbon atoms; $R_5$ and $R_7$ are the same or different, and are each independently hydrogen atom, halogen atom, alkyl group having 8 or less carbon atoms or phenyl group having 8 or less carbon atoms;

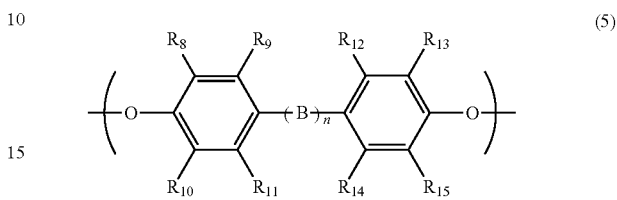

(5)

In formula (5), $R_8$, $R_9$, $R_{10}$, $R_{11}$, $R_{12}$, $R_{13}$, $R_{14}$ and $R_{15}$ are the same or different, and are each independently hydrogen atom, halogen atom, alkyl group having 8 or less carbon atoms or phenyl group having 8 or less carbon atoms; B is hydrocarbylene group, —O—, —CO—, —SO—, —SC—, —SO$_2$— or —C(CH$_3$)$_2$—.

Examples of vinyl thermosetting polyphenylene ether include methyl methacrylate-modified polyphenylene oxide MX9000 from Sabic, styryl-modified polyphenylene ether St-PPE-1 from Mitsubishi Chemical.

Preferably, the vinyl thermosetting polyphenylene ether has a number average molecular weight from 500 to 10,000 g/mol, preferably from 800 to 8,000 g/mol, and more preferably from 1,000 to 7,000 g/mol.

In the above resin composition, the bifunctional maleimide or polyfunctional maleimide has a structure as follow:

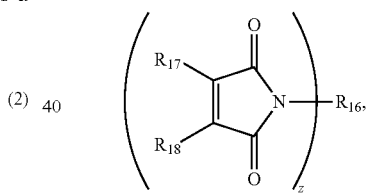

wherein $R_{16}$ is an aliphatic or aromatic organic group having a valence of z; $R_{17}$ and $R_{18}$ are each independently any one of hydrogen atom, halogen atom, substituted or unsubstituted C1-C8 linear alkyl group, and substituted or unsubstituted C1-C8 branched alkyl group; z represents an integer greater than or equal to 2.

Exemplary bifunctional maleimide is a bifunctional maleimide from K-I Chemical having the following structural formula:

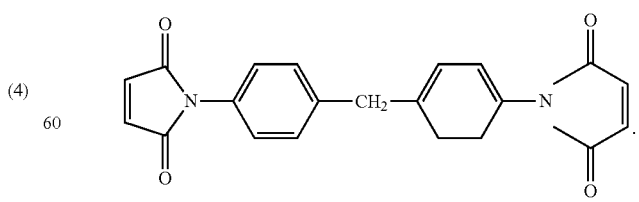

Exemplary polyfunctional maleimide is a polyfunctional maleimide from Jinyi Chemical having the following structural formula:

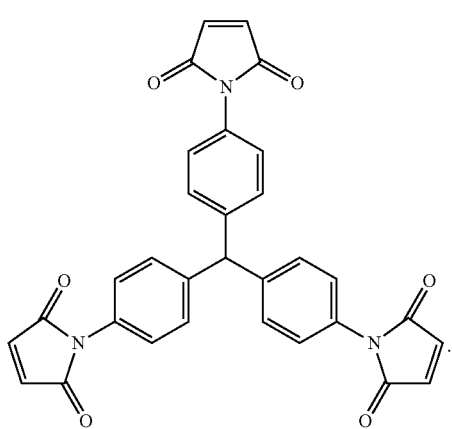 [SMILES: O=C1C=CC(=O)N1c1ccc(C(c2ccc(N3C(=O)C=CC3=O)cc2)c2ccc(N3C(=O)C=CC3=O)cc2)cc1]

In the above resin composition, the prepolymerization of the prepolymer of vinyl thermosetting polyphenylene ether and bifunctional maleimide or polyfunctional maleimide comprises the following steps:

(1) vinyl thermosetting polyphenylene ether is dissolved in a weakly polar solvent such as toluene or butanone, and bifunctional maleimide or polyfunctional maleimide is dissolved in a strongly polar solvent such as N,N-dimethylformamide or N-methylpyrrolidone;

(2) the vinyl thermosetting polyphenylene ether solution is mixed uniformly with the bifunctional maleimide or polyfunctional maleimide solution, then the mixture is heated to a set temperature, and a radical initiator is added, and then the mixture is prepolymerized at the set temperature for a certain period of time; the conversion ratio of bifunctional maleimide or polyfunctional maleimide is monitored by GPC, and is controlled in the range of 10-80%.

The radical initiator is selected from the group consisting of organic peroxide initiators, further preferably from any one of dilauroyl peroxide, dibenzoyl peroxide, cumyl peroxyneodecanoate, tert-butyl peroxyneodecanoate, tert-amyl peroxypivalate, tert-butyl peroxypivalate, tert-butyl peroxyisobutyrate, tert-butyl peroxy-3,5,5-trimethylhexanoate, tert-butyl peroxyacetate, tert-butyl peroxybenzoate, 1,1-di-(tert-butylperoxy)-3,5,5-trimethylcyclohexane, 1,1-di(tert-butylperoxy)cyclohexane, 2,2-di(tert-butylperoxy)butane, bis(4-tert-butylcyclohexyl)peroxydicarbonate, cetyl peroxydicarbonate, tetradecyl peroxydicarbonate, di-tert amyl peroxide, dicumyl peroxide, bis(tert-butylperoxyisopropyl)benzene, 2,5-dimethyl-2,5-di(tert-butylperoxy)hexane, 2,5-dimethyl-2,5-di(tert-butylperoxy)hexyne, diisopropylbenzene hydroperoxide, isopropylbenzene hydroperoxide, tert-amyl hydroperoxide, tert-butyl hydroperoxide, tert-butyl cumyl peroxide, diisopropylbenzene hydroperoxide, peroxy carbonate-tert-butyl 2-ethylhexanoate, tert-butyl peroxy 2-ethylhexyl carbonate, n-butyl 4,4-di (tert-butylperoxy)valerate, methyl ethyl ketone peroxide, cyclohexane peroxide, or a mixture of at least two of them.

In the above resin composition, the polyolefin resin is anyone selected from the group consisting of styrene-butadiene copolymer, polybutadiene or styrene-butadiene-divinylbenzene copolymer, or a mixture of at least two of them. Preferably, the polyolefin resin is anyone selected from the group consisting of amino-modified, maleic anhydride-modified, epoxy-modified, acrylate-modified, hydroxy-modified or carboxy-modified styrene-butadiene copolymer, polybutadiene, styrene-butadiene-divinylbenzene copolymer, or a mixture of at least two of them.

Examples of polyolefin resin are styrene-butadiene copolymer R100 from Samtomer, polybutadiene B-1000 from Nippon Soda, or styrene-butadiene-divinylbenzene copolymer R250 from Samtomer.

Preferably, the resin composition further comprises a component (C): an initiator. The initiator is a radical initiator. The radical initiator is selected from organic peroxide initiators, further preferably from any one of dilauroyl peroxide, dibenzoyl peroxide, cumyl peroxyneodecanoate, tert-butyl peroxyneodecanoate, tert-amyl peroxypivalate, tert-butyl peroxypivalate, tert-butyl peroxyisobutyrate, tert-butyl peroxy-3,5,5-trimethylhexanoate, tert-butyl peroxyacetate, tert-butyl peroxybenzoate, 1,1-di-(tert-butylperoxy)-3,5,5-trimethylcyclohexane, 1,1-di(tert-butylperoxy)cyclohexane, 2,2-di(tert-butylperoxy)butane, bis(4-tert-butylcyclohexyl)peroxydicarbonate, cetyl peroxydicarbonate, tetradecyl peroxydicarbonate, di-tert amyl peroxide, dicumyl peroxide, bis(tert-butylperoxyisopropyl)benzene, 2,5-dimethyl-2,5-di(tert-butylperoxy)hexane, 2,5-dimethyl-2,5-di(tert-butylperoxy)hexyne, diisopropylbenzene hydroperoxide, isopropylbenzene hydroperoxide, tert-amyl hydroperoxide, tert-butyl hydroperoxide, tert-butyl cumyl peroxide, diisopropylbenzene hydroperoxide, peroxy carbonate-tert-butyl 2-ethylhexanoate, tert-butyl peroxy 2-ethylhexyl carbonate, n-butyl 4,4-di (tert-butylperoxy)valerate, methyl ethyl ketone peroxide, cyclohexane peroxide, or a mixture of at least two of them.

The weight of the initiator is 1-3 parts by weight, for example, 1.2 parts by weight, 1.4 parts by weight, 1.6 parts by weight, 1.8 parts by weight, 2.0 parts by weight, 2.2 parts by weight, 2.4 parts by weight, 2.6 parts by weight or 2.8 parts by weight, based on 100 parts by weight of the total weight of the prepolymer of vinyl thermosetting polyphenylene ether and bifunctional maleimide or polyfunctional maleimide and the polyolefin resin.

Preferably, the resin composition further comprises a component (D): a flame retardant, which is a bromine-containing flame retardant or/and a phosphorus-containing flame retardant.

In the above resin composition, the flame retardant is a phosphorus-containing flame retardant comprising a DOPO structure, and the molecular formula thereof is as follow:

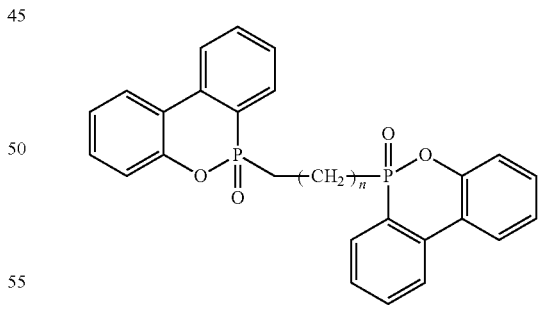

wherein n is an integer of 0 to 10, such as 1, 2, 3, 4, 5, 6, 7, 8 or 9.

Examples of phosphorus-containing flame retardant comprising a DOPO structure include a phosphorus-containing flame retardant XP-7866 from Albemarle, America.

The weight of the flame retardant is 0-40 parts by weight, for example, 2 parts by weight, 5 parts by weight, 9 parts by weight, 13 parts by weight, 17 parts by weight, 21 parts by weight, 25 parts by weight, 29 parts by weight, 33 parts by weight or 37 parts by weight, based on 100 parts by weight of the total weight of the prepolymer of vinyl thermosetting polyphenylene ether and bifunctional maleimide or polyfunctional maleimide, the polyolefin resin and the initiator.

Preferably, the resin composition further comprises a component (E): a filler, which is anyone selected from the group consisting of crystalline silica, amorphous silica, spherical silica, titanium dioxide, silicon carbide, glass fiber, alumina, aluminum nitride, boron nitride, barium titanate and strontium titanate, or a mixture of at least two of them.

The weight of the filler is 0-150 parts by weight, for example, 10 parts by weight, 20 parts by weight, 30 parts by weight, 40 parts by weight, 50 parts by weight, 60 parts by weight, 70 parts by weight, 80 parts by weight, 90 parts by weight, 100 parts by weight, 110 parts by weight, 120 parts by weight, 130 parts by weight or 140 parts by weight, based on 100 parts by weight of the total weight of the prepolymer of vinyl thermosetting polyphenylene ether and bifunctional maleimide or polyfunctional maleimide, the polyolefin resin, the initiator and the flame retardant.

The terms "comprise(s)", "comprising", "include(s)", "including" as used herein mean that, in addition to the described components, other components which impart different properties to the resin composition may be included. In addition, the terms "comprise(s)", "comprising", "include(s)", "including" described in the present invention may also be replaced by closed "is/are" or "consisting of/consist(s) of".

For example, the resin composition may also comprise various additives. Specific examples of the additives include antioxidant, heat stabilizer, antistatic agent, ultraviolet absorber, pigment, colorant, lubricant, and the like. These various additives may be used alone or in a mixture of two or more of them.

Further, the present invention provides a prepreg prepared by using the above resin composition, comprising a substrate and the resin composition as described above which is attached on the substrate after impregnation and drying.

Further, the present invention provides a laminate prepared by using the above resin composition, comprising a plurality of superimposed prepregs.

Further, the present invention provides a copper-clad laminate prepared by using the above resin composition, comprising a plurality of superimposed prepregs and a copper foil overlaying at one side or both sides of the superimposed prepregs.

Further, the present invention provides a printed circuit board prepared by using the above resin composition, comprising a plurality of superimposed prepregs.

The preparation of a high-speed electronic circuit substrate using the above formula comprises the following steps:

(1) Vinyl thermosetting polyphenylene ether is subjected to prepolymerization with bifunctional maleimide or polyfunctional maleimide in the presence of a radical initiator, and the conversion ratio of bifunctional maleimide or polyfunctional maleimide is determined by GPC detection and is controlled in the range of 10 to 80%. The weight of the bifunctional maleimide or the polyfunctional maleimide is 5 to 100 parts by weight based on 100 parts by weight of the vinyl thermosetting polyphenylene ether;

(2) Components of resin composition are weighed: the weight of the polyolefin resin is 5-100 parts by weight, based on 100 parts by weight of the prepolymer of vinyl thermosetting polyphenylene ether and bifunctional maleimide or polyfunctional maleimide; the weight of the initiator is 1-3 parts by weight, based on 100 parts by weight of the prepolymer of vinyl thermosetting polyphenylene ether and bifunctional maleimide or polyfunctional maleimide and the polyolefin resin; the weight of the flame retardant is 0-40 parts by weight, based on 100 parts by weight of the prepolymer of vinyl thermosetting polyphenylene ether and bifunctional maleimide or polyfunctional maleimide, the polyolefin resin and the initiator, and the weight of the filler is 0-150 parts by weight, based on 100 parts by weight of the prepolymer of vinyl thermosetting polyphenylene ether and bifunctional maleimide or polyfunctional maleimide, the polyolefin resin, the initiator and the flame retardant;

(3) The prepolymer of vinyl thermosetting polyphenylene ether and bifunctional maleimide or polyfunctional maleimide, the polyolefin resin, an optional initiator, an optional filler and an optional flame retardant are mixed, and an appropriate amount of a solvent is added, and the mixture is stirred to be dispersed uniformly, so that the filler and flame retardant are evenly dispersed in the glue solution; a substrate was impregnated in the prepared glue solution and dried in an oven at a suitable temperature for a certain period of time to remove the solvent to form a prepreg;

(4) Several prepregs are neatly superimposed, and copper foils overlay at the upper and lower surfaces of the superimposed prepregs, and then they are laminated and cured in a press machine to obtain a high-speed electronic circuit substrate.

Compared with the prior art, the present invention has the following beneficial effects:

(1) The present invention solves the problem of incompatibility of bifunctional maleimide or multifunctional maleimide with vinyl thermosetting polyphenylene ether and polyolefin resin by employing the prepolymer of vinyl thermosetting polyphenylene ether and bifunctional maleimide or polyfunctional maleimide. The mixed glue solution is uniform, the prepreg has a uniform appearance, and the substrate resin area is free of phase separation;

(2) The maleimide used in the present invention is a bifunctional maleimide or a polyfunctional maleimide, and thus the prepared substrate has higher heat resistance, smaller thermal expansion coefficient, longer thermal stratification time and higher thermal decomposition temperature, compared with a prepared substrate using monofunctional maleimide.

EMBODIMENTS

Technical solutions of the present invention are further described by the following examples.

Raw materials selected for preparing high-speed electronic circuit substrates in examples of the present invention are shown in Table 1 below.

TABLE 1

| Manufacturer | Name or trademark of materials | Description for materials |
|---|---|---|
| Sabic | MX9000 | Methyl methacrylate-modified polyphenylene ether |
| Mitsubishi Chemical | St-PPE-1 | Styryl-modtied polyphenylene ether |
| Wuhan ZHISHENG Science &Technology | Maleimide | Monofunctional maleimide |
| K-I Chemical | Maleimide | Bifunctional maleimide |

TABLE 1-continued

| Manufacturer | Name or trademark of materials | Description for materials |
|---|---|---|
| Jinyi Chemical | Maleimide | Trifunctional maleimide |
| Samtomer | R100 | Styrene-butadiene copolymer |
| Nippon Soda | B-1000 | Polybutadiene |
| Samtomer | R250 | Styrene-butadiene-divinylbenzene copolymer |
| Shanghai Gaoqiao Petrochemical Corp. | DCP | Dicumyl peroxide |
| Dongguan XINWEI Chemical Industry | BPO | Dibenzoyl peroxide |
| Sibelco | 525 | Fused silica powder |
| Albemarle, America | BT-93W | Bromine-containing flame retardant |
| Albemarle, America | XP-7866 | Phosphorus-containing flame retardant |
| Shanghai Honghe | 2116 | Glass fiber cloth |

I. Prepolymerization of Vinyl Thermosetting Polyphenylene Ether and Bifunctional Maleimide or Polyfunctional Malcimide Prepolymerization Example 1

70 g of vinyl thermosetting polyphenylene ether MX9000 was weighed and dissolved in 70 g of a toluene solvent. 5 g of bifunctional maleimide from K-I Chemical was weighed and dissolved in 20 g of a N,N-dimethylformamide solvent. The solution of vinyl thermosetting polyphenylene ether MX9000 and the solution of bifunctional maleimide from K-I chemical were mixed and stirred uniformly. The mixed solution was heated to 100° C., and then 0.1 g of DCP dissolved in 10 g of toluene was added and the mixture was reacted for 4 hours. Then the heating was stopped and the mixture was cooled for use.

Prepolymerization Example 2

70 g of vinyl thermosetting polyphenylene ether St-PPE-1 was weighed and dissolved in 70 g of a toluene solvent. 5 g of bifunctional maleimide from K-I Chemical was weighed and dissolved in 20 g of a N,N-dimethylformamide solvent. The solution of vinyl thermosetting polyphenylene ether St-PPE-1 and the solution of bifunctional maleimide from K-I chemical were mixed and stirred uniformly. The mixed solution was heated to 100° C., and then 0.1 g of DCP dissolved in 10 g of toluene was added and the mixture was reacted for 4 hours. Then the heating was stopped and the mixture was cooled for use.

Prepolymerization Example 3

70 g of vinyl thermosetting polyphenylene ether MX9000 was weighed and dissolved in 70 g of a toluene solvent. 5 g of trifunctional maleimide from Jinyi Chemical was weighed and dissolved in 20 g of a N,N-dimethylformamide solvent. The solution of vinyl thermosetting polyphenylene ether MX9000 and the solution of trifunctional maleimide from Jinyi Chemical were mixed and stirred uniformly. The mixed solution was heated to 100° C., and then 0.1 g of DCP dissolved in 10 g of toluene was added and the mixture was reacted for 4 hours. Then the heating was stopped and the mixture was cooled for use.

II. Preparation of High-Speed Electronic Circuit Substrates

Example 1

A prepolymer prepared by prepolymerization of 70 g parts by weight of vinyl thermosetting polyphenylene ether MX9000 and 5 g parts by weight of bifunctional maleimide from KI Chemical, 25 g parts by weight of butadiene-styrene copolymer R100, 3.0 parts by weight of a curing initiator DCP, 30 g parts by weight of a bromine-containing flame retardant BT-93 W and 50 g of fused silica powder 525 were dissolved in a toluene solvent and the solution was adjusted to a suitable viscosity. A 2116 fiberglass cloth was impregnated in the resulting glue solution and was controlled to a suitable weight by a clamp shaft, and was dried in an oven to remove the toluene solvent, and then a 2116 bonding sheet was obtained. Four 2116 bonding sheets were superimposed, and copper foils having a thickness of 1 OZ overlaid at the upper and lower surfaces of the superimposed bonding sheets, and then they were laminated and cured in a press machine in vacuum for 90 min with a curing pressure of 50 kg/cm$^2$ and a curing temperature of 200° C. to obtain a high-speed electronic circuit substrate. Physical properties thereof are shown in Table 2.

Example 2

A prepolymer prepared by prepolymerization of 70 g parts by weight of vinyl thermosetting polyphenylene ether MX9000 and 5 g parts by weight of bifunctional maleimide from KI Chemical, 25 g parts by weight of polybutadiene B-1000, 3.0 parts by weight of a curing initiator DCP, 30 g parts by weight of a bromine-containing flame retardant BT-93 W and 50 g of fused silica powder 525 were dissolved in a toluene solvent and the solution was adjusted to a suitable viscosity. A 2116 fiberglass cloth was impregnated in the resulting glue solution and was controlled to a suitable weight by a clamp shaft, and was dried in an oven to remove the toluene solvent, and then a 2116 bonding sheet was obtained. Four 2116 bonding sheets were superimposed, and copper foils having a thickness of 1 OZ overlaid at the upper and lower surfaces of the superimposed bonding sheets, and then they were laminated and cured in a press machine in vacuum for 90 min with a curing pressure of 50 kg/cm$^2$ and a curing temperature of 200° C. to obtain a high-speed electronic circuit substrate. Physical properties thereof are shown in Table 2.

Example 3

A prepolymer prepared by prepolymerization of 70 g parts by weight of vinyl thermosetting polyphenylene ether MX9000 and 5 g parts by weight of trifunctional maleimide from Jinyi Chemical, 25 g parts by weight of butadiene-styrene-divinylbenzene copolymer R250, 3.0 parts by weight of a curing initiator BPO, 30 g parts by weight of a bromine-containing flame retardant BT-93 W and 50 g of fused silica powder 525 were dissolved in a toluene solvent and the solution was adjusted to a suitable viscosity. A 2116 fiberglass cloth was impregnated in the resulting glue solution and was controlled to a suitable weight by a clamp shaft, and was dried in an oven to remove the toluene solvent, and then a 2116 bonding sheet was obtained. Four 2116 bonding sheets were superimposed, and copper foils having a thickness of 1 OZ overlaid at the upper and lower surfaces of the superimposed bonding sheets, and then they were laminated and cured in a press machine in vacuum for 90 min with a curing pressure of 50 kg/cm$^2$ and a curing temperature of 200° C. to obtain a high-speed electronic circuit substrate. Physical properties thereof are shown in Table 2.

Example 4

A prepolymer prepared by prepolymerization of 70 g parts by weight of vinyl thermosetting polyphenylene ether MX9000 and 5 g parts by weight of bifunctional maleimide from K-I Chemical, 25 g parts by weight of butadiene-styrene copolymer R100, 3.0 parts by weight of a curing initiator BPO, 30 g parts by weight of a phosphorus-containing flame retardant XP-7866 and 50 g of fused silica powder 525 were dissolved in a toluene solvent and the solution was adjusted to a suitable viscosity. A 2116 fiberglass cloth was impregnated in the resulting glue solution and was controlled to a suitable weight by a clamp shaft, and was dried in an oven to remove the toluene solvent, and then a 2116 bonding sheet was obtained. Four 2116 bonding sheets were superimposed, and copper foils having a thickness of 1 OZ overlaid at the upper and lower surfaces of the superimposed bonding sheets, and then they were laminated and cured in a press machine in vacuum for 90 min with a curing pressure of 50 kg/cm$^2$ and a curing temperature of 200° C. to obtain a high-speed electronic circuit substrate. Physical properties thereof are shown in Table 2.

Example 5

A prepolymer prepared by prepolymerization of 100 g parts by weight of vinyl thermosetting polyphenylene ether MX9000 and 5 g parts by weight of bifunctional maleimide from K-I Chemical, 5 g parts by weight of butadiene-styrene copolymer R100, 3.0 parts by weight of a curing initiator DCP, 30 g parts by weight of a bromine-containing flame retardant BT-93 W and 50 g of fused silica powder 525 were dissolved in a toluene solvent and the solution was adjusted to a suitable viscosity. A 2116 fiberglass cloth was impregnated in the resulting glue solution and was controlled to a suitable weight by a clamp shaft, and was dried in an oven to remove the toluene solvent, and then a 2116 bonding sheet was obtained. Four 2116 bonding sheets were superimposed, and copper foils having a thickness of 1 OZ overlaid at the upper and lower surfaces of the superimposed bonding sheets, and then they were laminated and cured in a press machine in vacuum for 90 min with a curing pressure of 50 kg/cm$^2$ and a curing temperature of 200° C. to obtain a high-speed electronic circuit substrate. Physical properties thereof are shown in Table 3.

Example 6

A prepolymer prepared by prepolymerization of 100 g parts by weight of vinyl thermosetting polyphenylene ether St-PPE-1 and 5 g parts by weight of bifunctional maleimide from K-I Chemical, 100 g parts by weight of butadiene-styrene copolymer R100, 3.0 parts by weight of a curing initiator DCP, 30 g parts by weight of a bromine-containing flame retardant BT-93 W and 50 g of fused silica powder 525 were dissolved in a toluene solvent and the solution was adjusted to a suitable viscosity. A 2116 fiberglass cloth was impregnated in the resulting glue solution and was controlled to a suitable weight by a clamp shaft, and was dried in an oven to remove the toluene solvent, and then a 2116 bonding sheet was obtained. Four 2116 bonding sheets were superimposed, and copper foils having a thickness of 1 OZ overlaid at the upper and lower surfaces of the superimposed bonding sheets, and then they were laminated and cured in a press machine in vacuum for 90 min with a curing pressure of 50 kg/cm$^2$ and a curing temperature of 200° C. to obtain a high-speed electronic circuit substrate. Physical properties thereof are shown in Table 3.

Example 7

A prepolymer prepared by prepolymerization of 100 g parts by weight of vinyl thermosetting polyphenylene ether MX9000 and 20 g parts by weight of bifunctional maleimide from K-I Chemical, 5 g parts by weight of butadiene-styrene copolymer R100, 3.0 parts by weight of a curing initiator DCP, 30 g parts by weight of a bromine-containing flame retardant BT-93 W and 50 g of fused silica powder 525 were dissolved in a toluene solvent and the solution was adjusted to a suitable viscosity. A 2116 fiberglass cloth was impregnated in the resulting glue solution and was controlled to a suitable weight by a clamp shaft, and was dried in an oven to remove the toluene solvent, and then a 2116 bonding sheet was obtained. Four 2116 bonding sheets were superimposed, and copper foils having a thickness of 1 OZ overlaid at the upper and lower surfaces of the superimposed bonding sheets, and then they were laminated and cured in a press machine in vacuum for 90 min with a curing pressure of 50 kg/cm$^2$ and a curing temperature of 200° C. to obtain a high-speed electronic circuit substrate. Physical properties thereof are shown in Table 3.

Example 8

A prepolymer prepared by prepolymerization of 100 g parts by weight of vinyl thermosetting polyphenylene ether St-PPE-1 and 20 g parts by weight of bifunctional maleimide from K-I Chemical, 100 g parts by weight of butadiene-styrene copolymer R100, 3.0 parts by weight of a curing initiator DCP, 30 g parts by weight of a bromine-containing flame retardant BT-93 W and 50 g of fused silica powder 525 were dissolved in a toluene solvent and the solution was adjusted to a suitable viscosity. A 2116 fiberglass cloth was impregnated in the resulting glue solution and was controlled to a suitable weight by a clamp shaft, and was dried in an oven to remove the toluene solvent, and then a 2116 bonding sheet was obtained. Four 2116 bonding sheets were superimposed, and copper foils having a thickness of 1 OZ overlaid at the upper and lower surfaces of the superimposed bonding sheets, and then they were laminated and cured in a press machine in vacuum for 90 min with a curing pressure of 50 kg/cm$^2$ and a curing temperature of 200° C. to obtain a high-speed electronic circuit substrate. Physical properties thereof are shown in Table 3.

Comparative Example 1

70 g parts by weight of vinyl thermosetting polyphenylene ether MX9000 dissolved in toluene, 5 g parts by weight of bifunctional maleimide from KI Chemical dissolved in N,N-dimethylformamide, 25 g parts by weight of butadiene-styrene copolymer R100, 3.0 parts by weight of a curing initiator DCP, 30 g parts by weight of a bromine-containing flame retardant BT-93 W and 50 g of fused silica powder 525 were dissolved in a toluene solvent and the solution was adjusted to a suitable viscosity. A 2116 fiberglass cloth was impregnated in the resulting glue and was controlled to a suitable weight by a clamp shaft, and was dried in an oven to remove the toluene solvent, and then a 2116 bonding sheet was obtained. Four 2116 bonding sheets were superimposed, and copper foils having a thickness of 1 OZ overlaid at the upper and lower surfaces of the superimposed bonding sheets, and then they were laminated and cured in a press machine in vacuum for 90 min with a curing pressure of 50 kg/cm$^2$ and a curing temperature of 200° C. to obtain a high-speed electronic circuit substrate. Physical properties thereof are shown in Table 2.

Comparative Example 2

70 g parts by weight of vinyl thermosetting polyphenylene ether MX9000 dissolved in toluene, 5 g parts by weight of monofunctional maleimide from Wuhan ZHISHENG Science &Technology dissolved in N,N-dimethylformamide, 25 g parts by weight of butadiene-styrene copolymer R100, 3.0 parts by weight of a curing initiator DCP, 30 g parts by weight of a bromine-containing flame retardant BT-93 W and 50 g of fused silica powder 525 were dissolved in a toluene solvent and the solution was adjusted to a suitable viscosity. A 2116 fiberglass cloth was impregnated in the resulting glue and was controlled to a suitable weight by a clamp shaft, and was dried in an oven to remove the toluene solvent, and then a 2116 bonding sheet was obtained. Four 2116 bonding sheets were superimposed, and copper foils having a thickness of 1 OZ overlaid at the upper and lower surfaces of the superimposed bonding sheets, and then they were laminated and cured in a press machine in vacuum for 90 min with a curing pressure of 50 kg/cm$^2$ and a curing temperature of 200° C. to obtain a high-speed electronic circuit substrate. Physical properties thereof are shown in Table 2.

TABLE 2

| Raw materials and Properties | Example 1 | Example 2 | Example 3 | Example 4 | Comparative Example 1 | Comparative Example 2 |
|---|---|---|---|---|---|---|
| MX9000 | 70 | 0 | 70 | 70 | 70 | 70 |
| St-PPE-1 | 0 | 70 | 0 | 0 | 0 | 0 |
| R100 | 25 | 0 | 0 | 25 | 25 | 25 |
| B-1000 | 0 | 25 | 0 | 0 | 0 | 0 |
| R250 | 0 | 0 | 25 | 0 | 0 | 0 |
| Bifunctional maleimide | 5 | 5 | 0 | 5 | 5 | 0 |
| Monofunctional maleimide | 0 | 0 | 0 | 0 | 0 | 5 |
| Trifunctional maleimide | 0 | 0 | 5 | 0 | 0 | 0 |
| DCP | 3 | 3 | 0 | 3 | 3 | 3 |
| BPO | 0 | 0 | 3 | 0 | 0 | 0 |
| BT-93W | 30 | 30 | 30 | 0 | 30 | 30 |
| XP-7866 | 0 | 0 | 0 | 30 | 0 | 0 |
| 525 | 0 | 50 | 50 | 50 | 50 | 50 |
| Glass transition temperature (° C.) | 210.0 | 210.0 | 220.0 | 210.0 | 210.0 | 190.0 |
| Thermal decomposition temperature (° C.) | 420.0 | 420.0 | 430.0 | 440.0 | 420.0 | 390.0 |
| Thermal stratification time T288 | >60 min | >60 min | >120 min | >60 min | >60 min | <60 min |
| Thermal expansion coefficient 50-260° C. | 1.8% | 1.8% | 1.6% | 1.8% | 1.8% | 2.7% |
| Flame retardancy | Grade V-0 | Grade V-0 | Grade V-0 | Grade V-0 | Grade V-0 | Grade V-0 |
| Dielectric constant (10 GHz) | 3.90 | 3.90 | 3.90 | 3.90 | 3.90 | 3.90 |
| Dielectric loss tangent (10 GHz) | 0.0048 | 0.0048 | 0.0048 | 0.0048 | 0.0048 | 0.0048 |
| Appearance of prepreg | Good appearance No crack | Good appearance No crack | Good appearance No crack | Good appearance No crack | Poor appearance with cracks | Poor appearance with cracks |
| Whether the substrate resin area has a phase separation | No phase separation | No phase separation | No phase separation | No phase separation | Phase separation occurs | Phase separation occurs |

TABLE 3

| Raw materials and Properties | Example 5 | Example 6 | Example 7 | Example 8 |
|---|---|---|---|---|
| MX9000 | 100 | 0 | 100 | 0 |
| St-PPE-1 | 0 | 100 | 0 | 100 |
| R100 | 5.25 | 105 | 6 | 120 |
| B-1000 | 0 | 0 | 0 | 0 |
| R250 | 0 | 0 | 0 | 0 |
| Bifunctional maleimide | 5 | 5 | 20 | 20 |
| Monofunctional maleimide | 0 | 0 | 0 | 0 |
| Trifunctional maleimide | 0 | 0 | 0 | 0 |
| DCP | 3 | 3 | 3 | 3 |
| BPO | 0 | 0 | 0 | 0 |
| BT-93W | 30 | 30 | 30 | 0 |
| XP-7866 | 0 | 0 | 0 | 0 |
| 525 | 50 | 50 | 50 | 50 |
| Glass transition temperature (° C.) | 200.0 | 200.0 | 225.0 | 230.0 |
| Thermal decomposition temperature (° C.) | 425.0 | 410.0 | 430.0 | 425.0 |
| Thermal stratification time T288 | >60 min | >60 min | >60 min | >60 min |
| Thermal expansion coefficient 50-260° C. | 1.6% | 2.8% | 1.5% | 2.2% |
| Flame retardancy | Grade V-0 | Grade V-0 | Grade V-0 | Grade V-0 |
| Dielectric constant (10 GHz) | 4.10 | 3.70 | 4.20 | 4.00 |
| Dielectric loss tangent (10 GHz) | 0.0055 | 0.0045 | 0.0060 | 0.0058 |
| Appearance of prepreg | Good appearance No crack | Good appearance No crack | Good appearance No crack | Good appearance No crack |
| Whether the substrate resin area has a phase separation | No phase separation | No phase separation | No phase separation | No phase separation |

Physical Properties Analysis:

As can be seen from Table 2 and Table 3, by prepolymerization of vinyl thermosetting polyphenylene oxide and bifunctional maleimide or polyfunctional maleimide, the problem of incompatibility of vinyl thermosetting polyphenylene ether, polyolefin resin and maleimide is solved; the prepared prepreg has a good appearance and the prepared substrate resin has no phase separation and an excellent overall performance such as dielectric properties and heat resistance.

As can be seen from Comparative Example 1, when vinyl thermosetting polyphenylene oxide and bifunctional maleimide are not subjected to prepolymerization, the prepreg has a poor appearance with defect of cracks, and there is a phase separation in the substrate resin area.

As can be seen from Comparative Example 2, when monofunctional maleimide is used and is not prepolymerized with vinyl thermosetting polyphenylene oxide, the prepreg has a poor appearance with defect of cracks, and there is a phase separation in the substrate resin area. In addition, heat resistance of the product is inferior to that of a product prepared by using bifunctional maleimide.

The examples of the present invention are described above and they are not intended to limit the present invention. Any changes and modifications made to the present invention according to the technical concept of the present invention fall within the protection scope of the present invention.

The applicant states that: the present application describes detailed means of the present invention by the aforesaid examples, but the present invention is not limited to the aforesaid detailed means. That is to say, it does not mean that the present invention cannot be fulfilled unless relying on the aforesaid detailed means. Those skilled in the art shall know that, any modification to the present invention, any equivalence replacement of each raw material of the product of the present invention and the addition of auxiliary ingredient, the selection of specific embodiment and the like all fall into the protection scope and the disclosure scope of the present invention.

The invention claimed is:

1. A resin composition, comprising:
   (A) a prepolymer of 70-100 parts of a vinyl thermosetting polyphenylene ether and 5-20 parts of a bifunctional maleimide or trifunctional maleimide; wherein the prepolymer is obtained in the presence of a radical initiator, and the conversion ratio of bifunctional maleimide or trifunctional maleimide is determined by GPC detection and is controlled in the range of 10 to 80%; and
   (B) 5.25-120 parts of a polyolefin resin which is selected from the group consisting of styrene-butadiene copolymer, polybutadiene, styrene-butadiene-divinylbenzene copolymer, and a mixture of at least two of them;
   wherein the vinyl thermosetting polyphenylene ether is selected from methyl methacrylate-modified polyphenylene ether and styryl-modified polyphenylene ether.

2. The resin composition of claim 1, wherein the vinyl thermosetting polyphenylene ether has a number average molecular weight from 500 to 10,000 g/mol.

3. The resin composition of claim 1, wherein the polyolefin resin comprises at least one member selected from the group consisting of amino-modified, maleic anhydride-modified, epoxy-modified, acrylate-modified, hydroxy-modified and carboxy-modified.

4. The resin composition of claim 1, wherein the resin composition further comprises an initiator.

5. The resin composition of claim 4, wherein the initiator is a radical initiator that is an organic peroxide initiator.

6. The resin composition of claim 5, wherein the radical initiator comprises at least one member selected from the group consisting of dilauroyl peroxide, dibenzoyl peroxide, cumyl peroxyneodecanoate, tert-butyl peroxyneodecanoate, tert-amyl peroxypivalate, tert-butyl peroxypivalate, tert-butyl peroxyisobutyrate, tert-butyl peroxy-3,5,5-trimethylhexanoate, tert-butyl peroxyacetate, tert-butyl peroxybenzoate, 1,1-di-(tert-butylperoxy)-3,5,5-trimethylcyclohexane, 1,1-di(tert-butylperoxy)cyclohexane, 2,2-di(tert-butylperoxy)butane, bis(4-tert-butylcyclohexyl)peroxydicarbonate, cetyl peroxydicarbonate, tetradecyl peroxydicarbonate, di-tert amyl peroxide, dicumyl peroxide, bis(tert-butylperoxy-isopropyl)benzene, 2,5-dimethyl-2,5-di(tert-butylperoxy) hexane, 2,5-dimethyl-2,5-di(tert-butylperoxy)hexyne, diisopropylbenzene hydroperoxide, isopropylbenzene hydroperoxide, tert-amyl hydroperoxide, tert-butyl hydroperoxide, tert-butyl cumyl peroxide, diisopropylbenzene hydroperoxide, peroxy carbonate-tert-butyl 2-ethylhexanoate, tert-butyl peroxy 2-ethylhexyl carbonate, n-butyl 4,4-di (tert-butylperoxy)valerate, methyl ethyl ketone peroxide and cyclohexane peroxide.

7. The resin composition of claim 4, wherein the weight of the initiator is 1-3 parts by weight, based on 100 parts by weight of the total weight of the prepolymer of vinyl thermosetting polyphenylene ether and bifunctional maleimide or trifunctional maleimide and the polyolefin resin.

8. The resin composition of claim 1, wherein the resin composition further comprises a flame retardant.

9. The resin composition of claim 8, wherein the flame retardant comprises at least one member selected from the group consisting of bromine-containing flame retardant and a phosphorus-containing flame retardant.

10. The resin composition of claim 8, wherein the flame retardant is a phosphorus-containing flame retardant comprising a DOPO structure of molecular formula

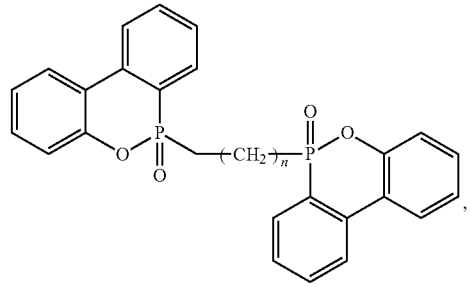

wherein n is an integer of 0 to 10.

11. The resin composition of claim 8, wherein the weight of the flame retardant is 2 to 40 parts by weight, based on 100 parts by weight of the total weight of the prepolymer of vinyl thermosetting polyphenylene ether and bifunctional maleimide or trifunctional maleimide, the polyolefin resin and the initiator.

12. The resin composition of claim 1, wherein the resin composition further comprises a filler; and
wherein the filler comprises at least one member selected from the group consisting of crystalline silica, amorphous silica, spherical silica, titanium dioxide, silicon carbide, glass fiber, alumina, aluminum nitride, boron nitride, barium titanate and strontium titanate.

13. The resin composition of claim 12, wherein the weight of the filler is 0-150 parts by weight, based on 100 parts by weight of the total weight of the prepolymer of vinyl thermosetting polyphenylene ether and bifunctional maleimide or trifunctional maleimide, the polyolefin resin, the initiator and the flame retardant.

14. A prepreg comprising a substrate and the resin composition of claim 1 which is attached on the substrate after impregnation and drying.

15. A laminate comprising at least one prepreg of claim 14 that is superimposed.

* * * * *